United States Patent
Min et al.

(10) Patent No.: US 12,406,532 B2
(45) Date of Patent: Sep. 2, 2025

(54) BEHAVIOR RECOGNITION ARTIFICIAL INTELLIGENCE NETWORK SYSTEM AND METHOD FOR EFFICIENT RECOGNITION OF HAND SIGNALS AND GESTURES

(71) Applicant: Korea Electronics Technology Institute, Seongnam-si (KR)

(72) Inventors: Kyoung Won Min, Seongnam-si (KR); Ganzorig Gankhuyag, Seoul (KR); Haeng Seon Son, Seongnam-si (KR); Seon Young Lee, Seoul (KR); Young Bo Shim, Seongnam-si (KR); Chang Gue Park, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 379 days.

(21) Appl. No.: 18/073,058

(22) Filed: Dec. 1, 2022

(65) Prior Publication Data
US 2023/0196841 A1 Jun. 22, 2023

(30) Foreign Application Priority Data
Dec. 21, 2021 (KR) .................. 10-2021-0183642

(51) Int. Cl.
*G06V 40/20* (2022.01)
*G06V 10/22* (2022.01)
*G06V 10/40* (2022.01)

(52) U.S. Cl.
CPC .............. *G06V 40/28* (2022.01); *G06V 10/22* (2022.01); *G06V 10/40* (2022.01)

(58) Field of Classification Search
CPC ........ G06V 40/28; G06V 10/22; G06V 10/40; G06V 10/82; G06V 10/469; G06V 40/113;
(Continued)

(56) References Cited

U.S. PATENT DOCUMENTS 11,270,455 B2 * 3/2022 Zhang ................ G06V 40/23
11,854,308 B1 * 12/2023 Marsden .............. G06V 10/764
(Continued)

FOREIGN PATENT DOCUMENTS

KR 10-2020-0011425 A 2/2020

OTHER PUBLICATIONS

Chen, Yuxin, et al., "Channel-wise Topology Refinement Graph Convolution for Skeleton-Based Action Recognition" (Year: 2021).*
(Continued)

*Primary Examiner* — Andrew M Moyer
*Assistant Examiner* — Ahmed A Nasher
(74) *Attorney, Agent, or Firm* — NSIP Law

(57) ABSTRACT

There are provided a behavior recognition method for efficient recognition of hand signals and gesture and a behavior recognition AI network system using the same. The behavior recognition method for efficient recognition of hand signals and gestures according to an embodiment includes: an input feature extraction step of extracting, by a behavior recognition AI network system, key points F1 from bounding box data of an object which makes hand signals to be inputted by sequence, and generating skeleton data of the object; and a spatial feature extraction step of calculating, by the behavior recognition AI network system, a length F2 and an angle F3 of a bone vector based on the key points F1 and the skeleton data, and extracting a spatial feature. Accordingly, performance of recognition of hand signals and gestures may be enhanced.

12 Claims, 9 Drawing Sheets

(58) Field of Classification Search
CPC ...... G06V 40/107; G06V 10/34; G06N 3/045; G06T 7/20; G06T 2210/12; G06T 2207/20044; G06T 2207/30196
See application file for complete search history.

(56) References Cited

U.S. PATENT DOCUMENTS

| | | | |
|---|---|---|---|
| 2018/0315230 A1* | 11/2018 | Black | G06T 7/75 |
| 2019/0180473 A1* | 6/2019 | Guleryuz | G06F 3/017 |
| 2024/0104776 A1* | 3/2024 | Yoshida | G06T 7/70 |

OTHER PUBLICATIONS

Yan et al., "Spatial Temporal Graph Convolutional Networks for Skeleton-Based Action Recognition" (Year: 2018).*
Chen, Yuxin, et al., "Channel-wise Topology Refinement Graph Convolution for Skeleton-Based Action Recognition", Proceedings of the IEEE/CVF International Conference on Computer Vision, arXiv:2107.12213v2, Aug. 23, 2021, (13 Pages in English).
Korean Office Action Issued on Oct. 30, 2024, in Counterpart Korean Patent Application No. 10-2021-0183642 (3 Pages in English, 5 Pages in Korean).

* cited by examiner

BEHAVIOR RECOGNITION ARTIFICIAL INTELLIGENCE NETWORK SYSTEM AND METHOD FOR EFFICIENT RECOGNITION OF HAND SIGNALS AND GESTURES

CROSS-REFERENCE TO RELATED APPLICATION(S) AND CLAIM OF PRIORITY

This application is based on and claims priority under 35 U.S.C. § 119 to Korean Patent Application No. 10-2021-0183642, filed on Dec. 21, 2021, in the Korean Intellectual Property Office, the disclosure of which is herein incorporated by reference in its entirety.

BACKGROUND

Field

The disclosure relates to a behavior recognition method and a behavior recognition artificial intelligence (AI) network system using the same, and more particularly, to a behavior recognition method for efficient recognition of hand signals and gestures, and a behavior recognition AI network system using the same.

Description of Related Art

A typical behavior recognition method adopts a method of collecting and interpreting data of behavior of a person which is included in a 2D or 3D image collected by using various sensors, such as a camera, a LiDAR, and typically extracts positions (x, y or x, y, z) of key points corresponding to joints of the person and confidence of the positions, estimates a pose by forming a skeleton by connecting the key points having coordinate values, and recognizes a behavior through time-series prediction regarding continuous change in the pose.

In this case, the pose estimation method may be mostly divided into a bottom-up method and a top-down method. The bottom-up method refers to a method of estimating a pose by extracting all joints of a person included in an input image, and analyzing a correlation of the joints like OpenPose.

The top-down method refers to a method of finding an object (person) in an image, first, and estimating a pose from a bounding box of the detected object, and mostly uses AlphaPose and Mask-RCNN.

As shown in FIG. 1, AlphaPose is able to perform pose estimation regarding a plurality of objects (persons) existing in an image in real time, by extracting 18 joint key points in total as features, and shows performance rivaling state-of-the-art (SOTA) in accuracy and efficiency.

A most frequently method of recognizing a behavior is based on time-series prediction, and typically is known as a long short-term memory (LSTM). As shown in FIG. 2, a behavior recognition structure utilizing the LSTM may extract 34 (=17*2) key point values from every frame and may convert the key point values into vectors, and may collect the vectors in the order of time series and may use the same as an input for recognizing a behavior of an LSTM network.

Such existing pose extraction methods use x, y coordinates and confidence values as key features, but may have a problem that hand signals or gestures recognized on a road are inputted in various forms according to respective positions of a hand signal performer and a receiver (a vehicle and a roadside CCTV), differently from information that is initially inputted at the time of training.

Inaccurate recognition of gestures may cause confusion in movement of vehicles on a road, and may cause an accident, and accordingly, the gestures should robustly be recognized even in various conditions, situations. However, the method of simply using only x, y coordinates and confidence as features may put limitation on effective gesture recognition in various positions, and effective and stable posture information extraction and behavior recognition in a blocking and occlusion situation occurring due to other objects such as a vehicle, a road structure, or the like. Accordingly, there is a demand for an AI model and a system for solving this problem.

SUMMARY

To address the above-discussed deficiencies of the prior art, it is a primary object of the disclosure to provide a behavior recognition method which enhances performance of recognition of hand signals and gestures by using a robust temporal graph convolution network (RG-GCN) model in a process of utilizing x, y coordinate values, confidence, and a length and an angle of a bone vector (a slope between bones) as features, in order to extract a pose of an object (a traffic police or a corresponding person) which makes hand signals, and recognizing hand signals and gestures by using the extracted features, and a behavior recognition AI network system using the same.

According to an embodiment of the disclosure to achieve the above-described object, there is provided a behavior recognition method for efficient recognition of hand signals and gestures, the method including: an input feature extraction step of extracting, by a behavior recognition AI network system, key points F1 from bounding box data of an object which makes hand signals to be inputted by sequence, and generating skeleton data of the object; and a spatial feature extraction step of calculating, by the behavior recognition AI network system, a length F2 and an angle F3 of a bone vector based on the key points F1 and the skeleton data, and extracting a result of calculating as a spatial feature.

The spatial feature extraction step may include, when the skeleton data is formed of 0 to 17 key points, setting a bone corresponding to a distance between key points to X0 to X17 in order to calculate the length of the bone vector, and normalizing respective bone vectors to X0 vector by applying Equation 1 presented below:

$$F_2 \rightarrow \left\{ \frac{\|X_i\|}{\|X_0\|} \right\}_{i \in \{0, \ldots, 17\}} \quad \text{Equation 1}$$

In addition, the spatial feature extraction step may include, when the skeleton data is formed of 0 to 17 key points, calculating an angle of a bone vector adjacent to each key point by applying Equation 2 presented below:

$$F_3 \rightarrow \left\{ \cos\left( \frac{\vec{x_i} \cdot \vec{x_j}}{\|x_i\| \|x_j\|} \right) \right\}_{i \in \{0, \ldots, N\}, j \in \{0, \ldots, M\} i \neq j} \quad \text{Equation 2}$$

According to an embodiment, the behavior recognition method may further include a new feature generation step of generating a new feature F4 by concatenating the input feature F1 and the spatial features F2 and F3.

In addition, the behavior recognition AI network system may recognize hand signals made by the object or a behavior of the object by applying the new feature F4 generated at the new feature generation step to an RT-GCN model.

The RT-GCN model may include: an RT-GCN block which includes a robust GCN provided to ensure robustness by applying various types of fixed adjacency matrixes in case key points are misrecognized, and a TCN provided to consider time-series characteristics; and a pooling layer and a FCN provided to recognize hand signals made by an object or a behavior of the object.

In addition, an input tensor of the RT-GCN block may be expressed by C×T×V, where C is a number of channels of the new feature F4, T is a number of temporal frames, and V is a number of nodes of key points of a skeleton.

According to another embodiment of the disclosure, there is provided a behavior recognition AI network system for efficient recognition of hand signals and gestures, the system including: a sensor module configured to collect bounding box data of an object which makes hand signals by sequence; and a hand signal recognition module configured to perform an input feature extraction operation of extracting key points F1 from the bounding box data collected through the sensor module, and generating skeleton data of the object, and a spatial feature extraction operation of calculating a length F2 and an angle F3 of a bone vector based on the key points F1 and the skeleton data, and extracting a result of calculating as a spatial feature, in order to recognize hand signals.

According to embodiments of the disclosure as described above, performance of recognition of hand signals and gestures may be enhanced by using a robust temporal graph convolution network (RG-GCN) model in a process of utilizing x, y coordinate values, confidence, and a length and an angle of a bone vector (a slope between bones) as features, in order to extract a pose of an object (a traffic police or a corresponding person) which makes hand signals, and recognizing hand signals and gestures by using the extracted features.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
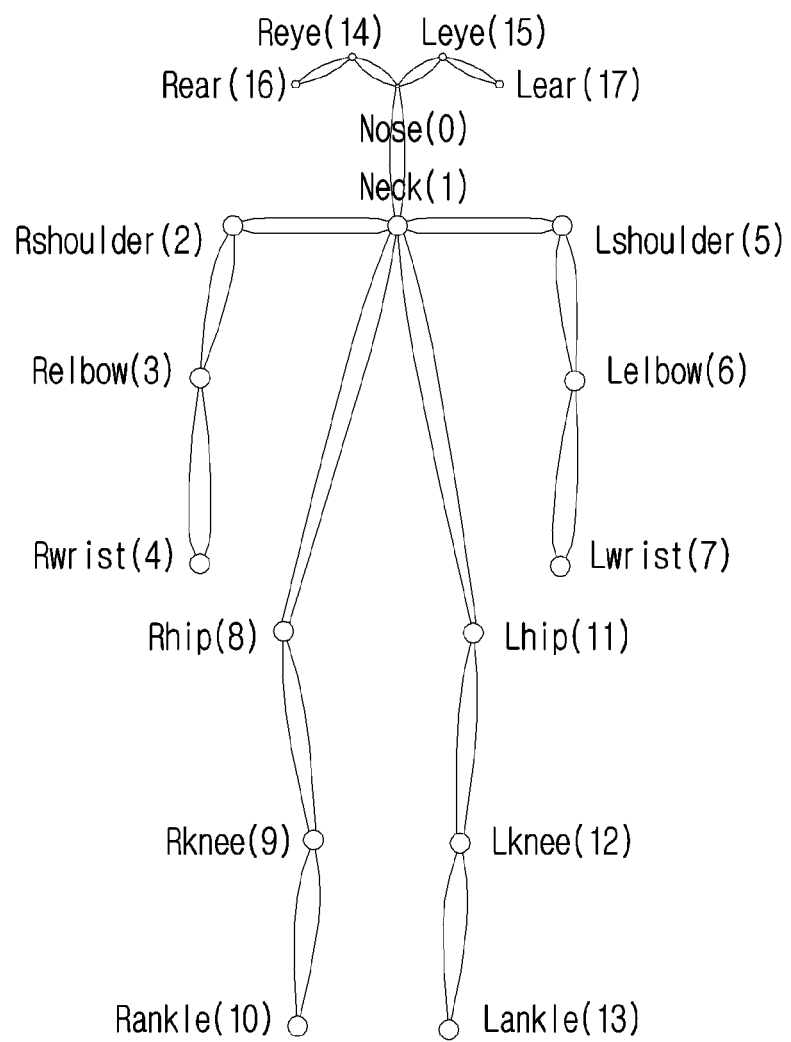
FIG. 1 is a view illustrating a skeleton model of a person which is formed of 18 key points.
Figure 2:
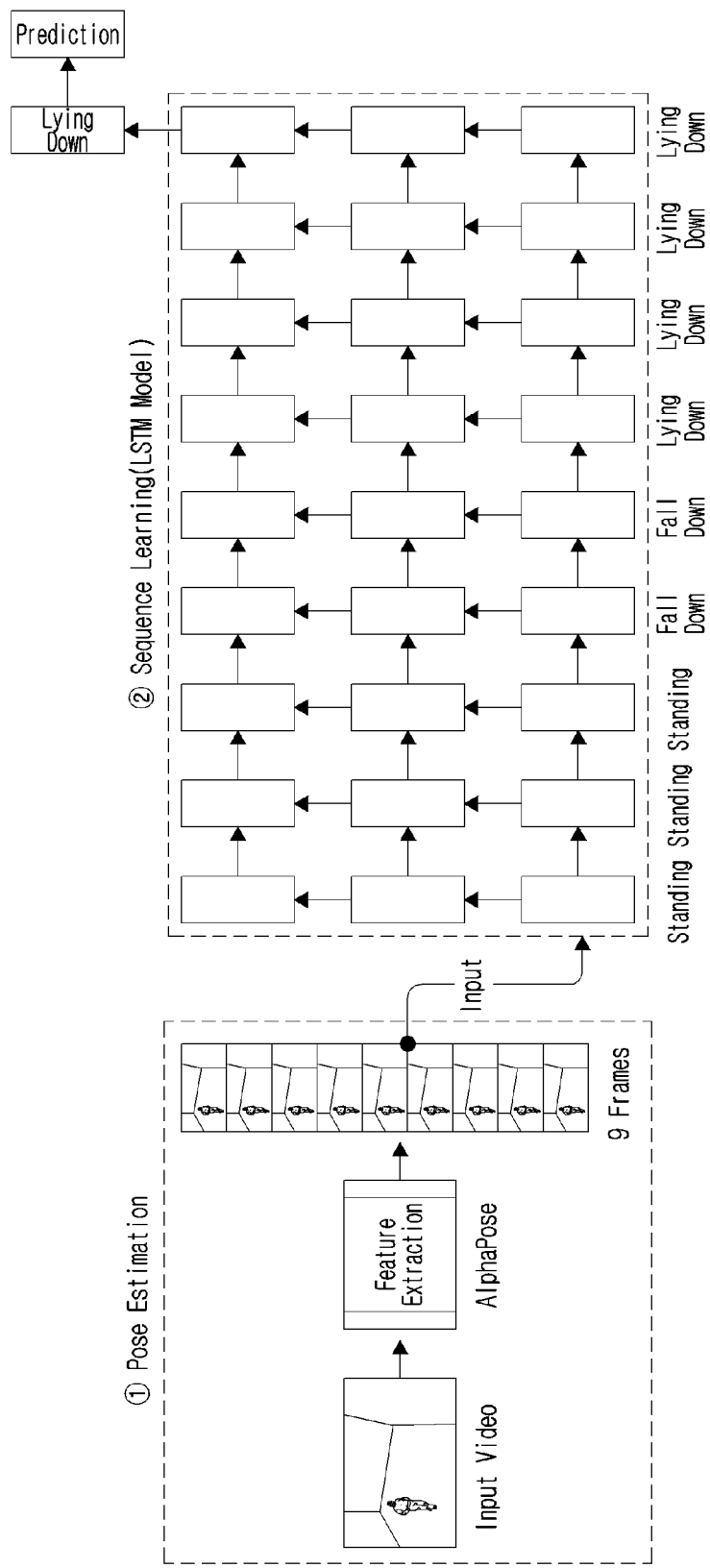
FIG. 2 is a view illustrating an existing LSTM-based behavior recognition system operation structure.
Figure 3:
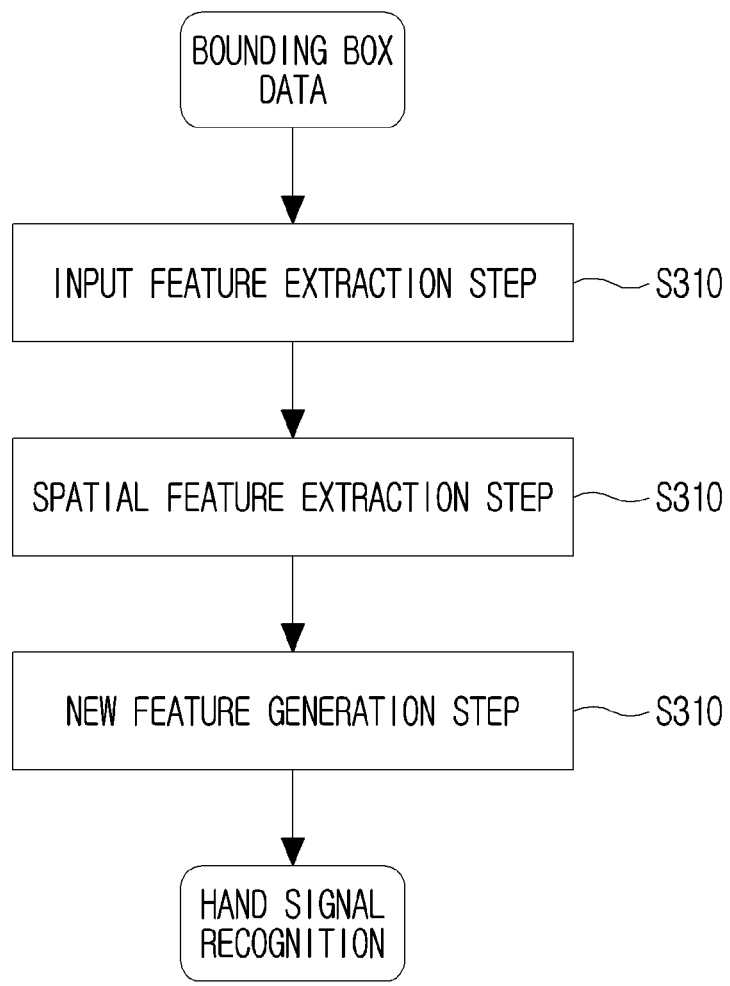
FIG. 3 is a view provided to explain a behavior recognition method for efficient recognition of hand signals and gestures according to an embodiment of the disclosure.
Figure 4:
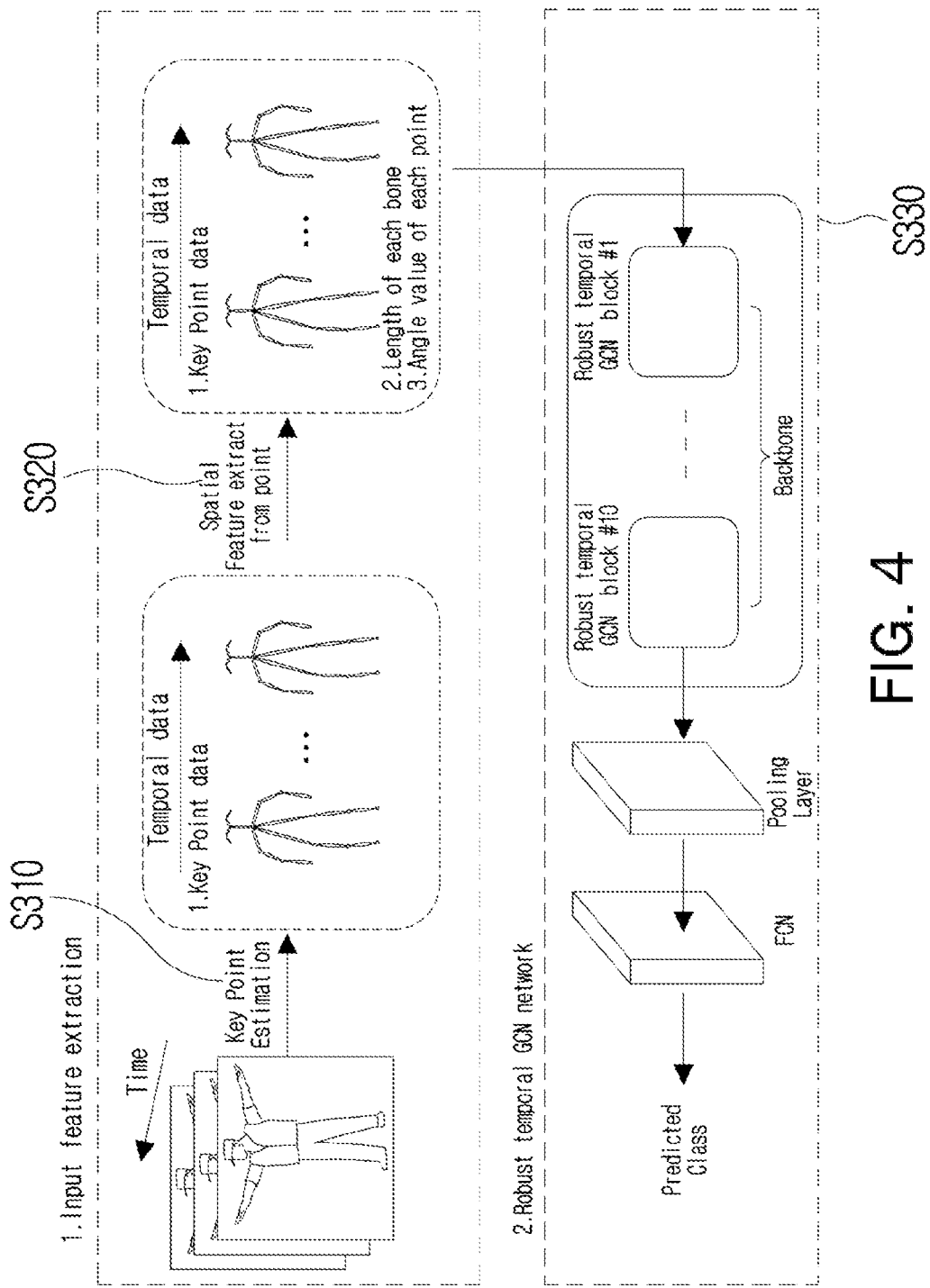
FIG. 4 is a view provided to explain a behavior recognition method for efficient recognition of hand signals and gestures according to an embodiment of the disclosure.

FIG. 3 is a view provided to explain a behavior recognition method for efficient recognition of hand signals and gestures (hereinafter, referred to as a 'behavior recognition method') according to an embodiment of the disclosure, and FIG. 4 is a view provided to explain the behavior recognition method for efficient recognition of hand signals and gestures in detail according to an embodiment of the disclosure.

The behavior recognition method according to the present embodiment may enhance a related-art method of using only x, y coordinate values and confidence as features for the sake of pose extraction for recognition of hand signals and gestures, and may add data regarding a length and an angle (a slope between bones) of a bone vector as a feature for pose extraction, and may use a robust temporal graph convolution network (RT-GCN) model in a process of recognizing hand signals and gestures, thereby enhancing performance of recognition of hand signals and gestures.

To achieve this, the present behavior recognition method may include an input feature extraction step (S310), a spatial feature extraction step (S320), and a new feature generation step (S330).

At the input feature extraction step (S310), key points F1 may be extracted from bounding box data of an object which makes hand signals to inputted by sequence, and skeleton data of the object may be generated. In this case, the key points F1 extracted from the bounding box data of the object and the skeleton data configured by the key points are illustrated in FIG. 6A.

Specifically, at the input feature extraction step (S310), when input data is collected from bounding box data of a traffic police who makes hand signals by sequence, key points may be extracted from the input data through key point estimation, and skeleton data may be generated. In this case, the key points may be extracted by using a typical key point-based feature extraction model like AlphaPose.

At the spatial feature extraction step (S320), a length F2 and an angle F3 of a bone vector may be calculated based on the key points F1 and the bone data, and a result of the calculation may be extracted as a spatial feature. Herein, the length F2 and the angle F3 of the bone vector are illustrated in FIGS. 6B and 6C.

At the new feature generation step (S330), a new feature F4 may be generated by concatenating the input feature F1 and the spatial features F2 and F3.

Figure 5:
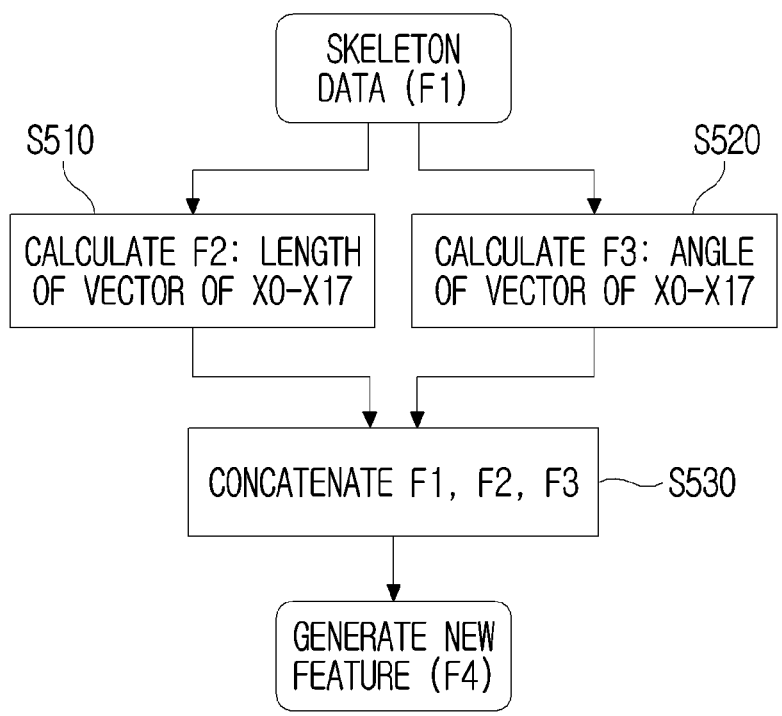
FIG. 5 is a view provided to explain a process of generating a new feature in detail according to an embodiment of the disclosure.
Figure 6:
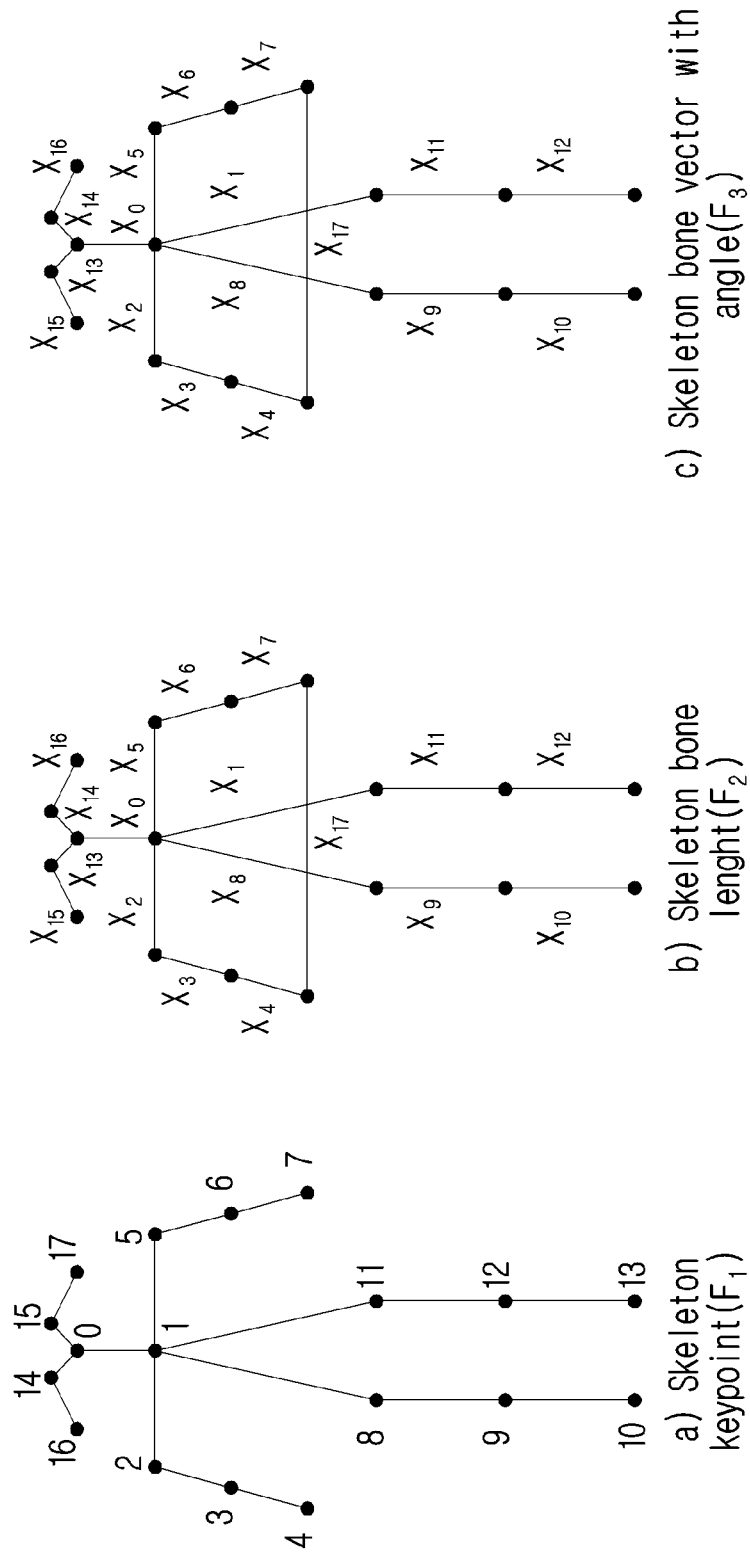
FIG. 6 is a view provided to explain a process of calculating key points of skeleton data and a length and an angle of a bone vector at a spatial feature extraction step according to an embodiment of the disclosure.

FIG. 5 is a view provided to explain a process of generating a new feature in detail according to an embodiment of the disclosure, and FIG. 6 is a view provided to explain a process of calculating key points of skeleton data and a length and an angle of a bone vector at the spatial feature extraction step according to an embodiment of the disclosure.

At the spatial feature extraction step according to the present embodiment, when skeleton data is formed of 0 to 17 key points F1, a length F2 of a bone vector of X0 to X17 may be calculated (S510), and an angle F3 of the bone vector of X0 to X17 may be calculated (S520).

Specifically, at the spatial feature extraction step, when skeleton data is formed of 0 to 17 key points, a bone corresponding to a distance between key points may be set to X0 to X17 in order to calculate a length of a bone vector as shown in FIG. 6B, and each bone vector may be normalized to X0 vector by applying Equation 1 presented below:

$$F_2 \rightarrow \left\{ \frac{\|X_i\|}{\|X_0\|} \right\}_{i \in \{0, \ldots, 17\}}$$ Equation 1

In addition, at the spatial feature extraction step, when the skeleton data is formed of 0 to 17 key points, an angle of a bone vector adjacent to each key point may be calculated by applying Equation 2 presented below:

$$F_3 \rightarrow \left\{ \cos\left( \frac{\vec{x_i} \cdot \vec{x_j}}{\|x_i\| \|x_j\|} \right) \right\}_{i \in \{0, \ldots, N\}, j \in \{0, \ldots, M\} i \neq j}$$ Equation 2

Combinations of xi, xj of the bone vector generated through the above-described process may be as follow:
{{x0,x1}, {x0,x8}, {x0,x2}, {x0,x5}, {x0,x13}, {x0, x14}, {x13, x15}, {x14,x16}, {x2,x3}, {x3,x4}, {x5,x6}, {x6,x7}, {x8,x9}, {x9,x10}, {x1, x11}, {x11, x12}, {x4, x17}, {x7, x17}}

In addition, at the new feature generation step, a new feature F4 may be generated by concatenating the input feature F1 and the length and the angle of the bone vector corresponding to the spatial features F2 and F3 (S530), as shown in Equation 3:

$$F_4 \rightarrow \text{concatenate}(F_1, F_2, F_3)$$ Equation 3

Figure 7:
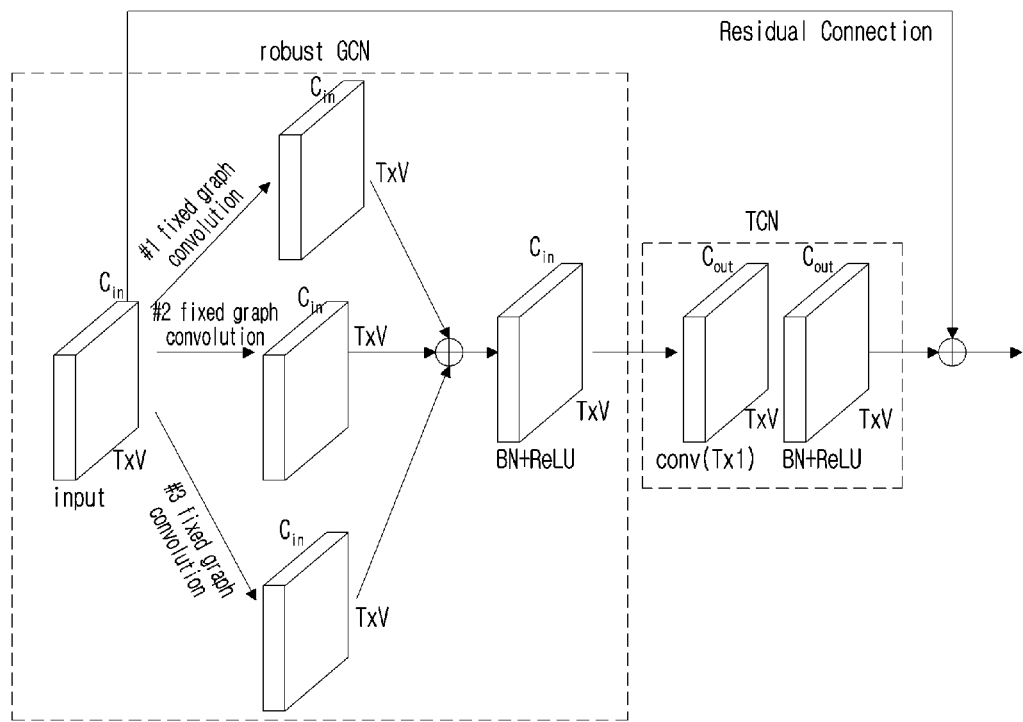
FIG. 7 is a view provided to explain an RT-GCN model according to an embodiment of the disclosure.

FIG. 7 is a view provided to explain an RT-GCN model according to an embodiment of the disclosure.

The behavior recognition method according to the present embodiment may use a robust temporal graph convolution network (RT-GCN) model in a process of recognizing hand signals and gestures in order to enhance performance of recognition of hand signals and gestures.

Specifically, the behavior recognition method may recognize hand signals made by an object or a behavior of the object by applying a new feature F4 generated at the new feature generation step to the RT-GCN model.

Herein, the RT-GCN model may include: an RT-GCN block which includes a robust GCN provided to ensure robustness by applying various types of fixed adjacency matrixes in case key points are misrecognized, and a temporal convolution network (TCN) provided to consider time-series characteristics; and a pooling layer and a fully connected network (FCN) provided to recognize hand signals made by an object or a behavior of the object.

In addition, an input tensor of the RT-GCN block may be expressed by C×T×V, where C is the number of channels of the new feature F4, T is the number of temporal frames, and V is the number of nodes of key points of a skeleton.

In addition, the robust GCN may estimate a skeleton based on Equation 4 presented below:

$$G = (V, A, X)$$ Equation 4

In this case, V is the number of nodes of key points of a skeleton, and A is an adjacency matrix and refers to a connection between key points ($A \in R^{N \times M}$)

X is feature data ($X=[x_1, x_2, \ldots, x_N] \in R^{N \times M}$), and M is a dimension of a feature existing at a key point. M of the input feature $F_4$ may be expressed by C×N (number of nodes), and C is the number of channels of the new feature F4 (x, y coordinates, a confidence score, a bone length, an angle from bone).

The TCN may be used to consider time-series characteristics. The TCN is a (T×1) convolution kernel, and, by considering time-series characteristics of continuous frames through this, hand signals of a traffic police coming continuously may be more exactly recognized.

Figure 8:
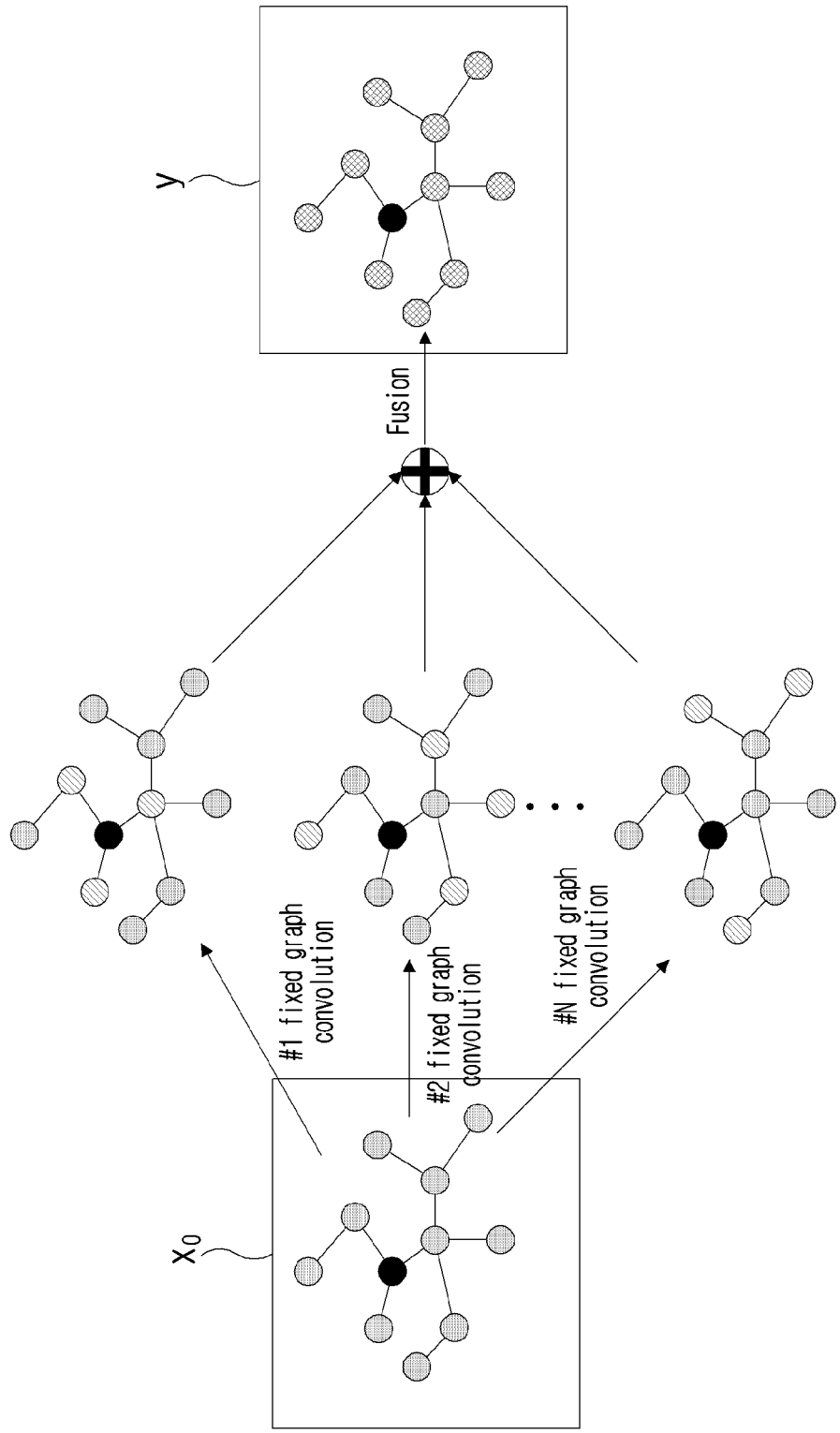
FIG. 8 is a concept view of a robust fixed adjacency matrix which is used in a robust GCN according to an embodiment of the disclosure.

FIG. 8 is a concept view of a robust fixed adjacency matrix which is used in the robust GCN according to an embodiment of the disclosure.

A red node of FIG. 8 is a central node. An orange node is a node that performs convolution with the central node. A graph x0 on the left is an input graph and graphs in the middle show a process of proceeding with fixed graph convolution.

A graph y on the right shows a result of combining results of performing convolution with respect to the input graph with a plurality of fixed adjacent matrixes. Herein, the fixed adjacency matrix may use a pre-set value.

Figure 9:
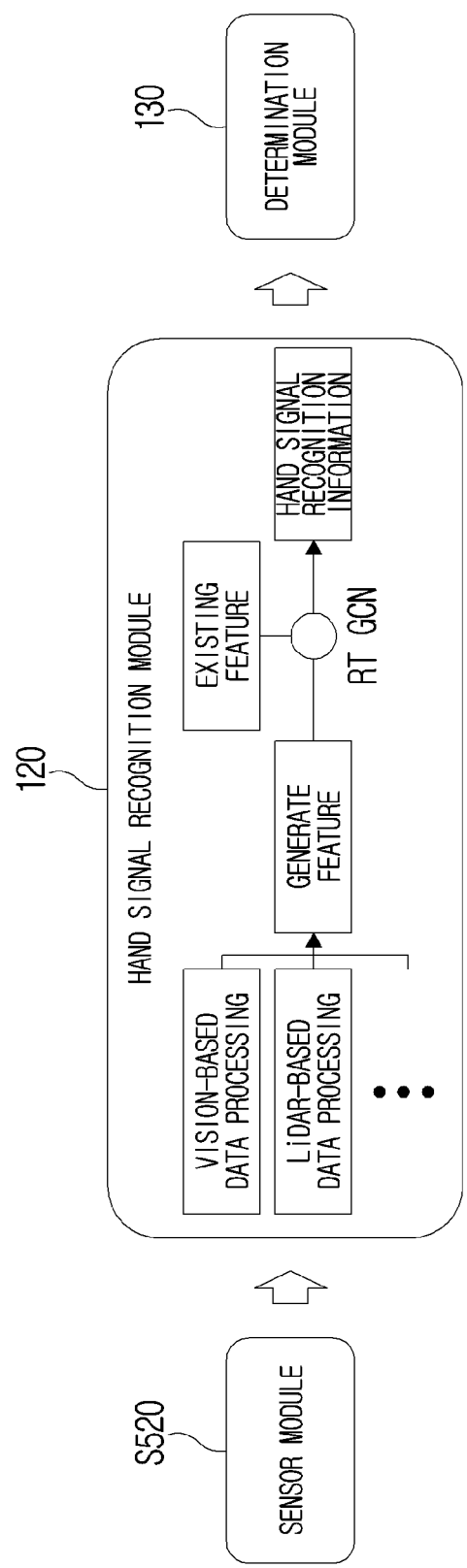
FIG. 9 is a view provided to explain a behavior recognition AI network system for efficient recognition of hand signals and gestures according to an embodiment of the disclosure.

FIG. 9 is a view provided to explain a behavior recognition AI network system for efficient recognition of hand signals and gestures according to an embodiment of the disclosure.

The behavior recognition AI network system according to the present embodiment may execute the behavior recognition method described above with reference to FIGS. 3 to 8.

To achieve this, the behavior recognition AI network system may include a sensor module 110, a hand signal recognition module 120, and a determination module 130.

The sensor module 110 may collect bounding box data of an object which makes hand signals by sequence.

The hand signal recognition module 120 may perform an input feature extraction operation, a spatial feature extraction operation, and a new feature generation operation in order to recognize hand signals and gestures.

Specifically, the hand signal recognition module 120 may perform the input feature extraction operation of extracting key points F1 from the bounding box data collected through the sensor module 110, and generating skeleton data of the object.

In addition, when the feature extraction operation is performed, the hand signal recognition module 120 may perform the spatial feature extraction operation of calculating a length F2 and an angle F3 of a bone vector, based on the key points F1 and the skeleton data, and extracting a result of calculating as a spatial feature.

In addition, when the spatial feature extraction operation is performed, the hand signal recognition module 120 may perform the new feature generation operation of generating a new feature F4 by concatenating the input feature F1 and the spatial features F2 and F3.

In addition, the hand signal recognition module 120 may recognize hand signals made by the object, by applying the new feature F4 generated at the new feature generation step to an RT-GCN model.

The determination module 130 may proceed with decision-making for recognition of hand signals and gestures by utilizing a result of recognizing hand signals through the hand signal recognition module 120.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A behavior recognition method for recognition of hand signals and gestures, the method comprising:
    extracting, by a behavior recognition AI network system, key points F1 from bounding box data of an object which makes hand signals to be inputted by sequence, and generating skeleton data of the object;
    calculating, by the behavior recognition AI network system, a respective length F2 and a respective angle F3 of a respective bone vector based on the key points F1 and the skeleton data, and extracting spatial features from a result of calculating, each spatial feature including the respective length F2 and the respective angle F3 of the respective bone vector;
    generating a new feature F4 by concatenating the input feature of the key points F1 and the spatial features each including the respective length F2 and the respective angle F3 of the respective bone vector; and
    recognizing hand signals made by the object or a behavior of the object by inputting the new feature F4 to a neural network-based model.

2. The behavior recognition method of claim 1, wherein the calculating comprises, when the skeleton data is formed of 0 to 17 key points, setting a bone corresponding to a distance between key points to X0 to X17 in order to calculate the length of the bone vector, and normalizing respective bone vectors to X0 vector by applying Equation 1 presented below:

$$F_2 \rightarrow \left\{ \frac{\|X_i\|}{\|X_0\|} \right\}_{i \in \{0, \ldots, 17\}}. \quad \text{Equation 1}$$

3. The behavior recognition method of claim 2, wherein the calculating comprises, when the skeleton data is formed of 0 to 17 key points, calculating an angle of a bone vector adjacent to each key point by applying Equation 2 presented below:

$$F_3 \rightarrow \left\{ \cos\left( \frac{\vec{x_i} \cdot \vec{x_j}}{\|x_i\| \|x_j\|} \right) \right\}_{i \in \{0, \ldots, N\}, j \in \{0, \ldots, M\} i \neq j}. \quad \text{Equation 2}$$

4. The behavior recognition method of claim 1, wherein the behavior recognition AI network system is configured to recognize the hand signals made by the object or a behavior of the object by applying the new feature F4 to an RT-GCN model corresponding to the neural network-based model.

5. The behavior recognition method of claim 4, wherein the RT-GCN model comprises: an RT-GCN block which comprises a robust GCN provided to ensure robustness by applying various types of fixed adjacency matrixes in case key points are misrecognized, and a TCN provided to consider time-series characteristics; and a pooling layer and a FCN provided to recognize hand signals made by an object or a behavior of the object.

6. The behavior recognition method of claim 5, wherein an input tensor of the RT-GCN block is expressed by C×T×V, where C is a number of channels of the new feature F4, T is a number of temporal frames, and V is a number of nodes of key points of a skeleton.

7. A behavior recognition AI network system for recognition of hand signals and gestures, the system comprising:
    one or more processors comprising:
    a sensor module configured to collect bounding box data of an object which makes hand signals by sequence; and
    a hand signal recognition module configured to:
    perform an input feature extraction operation of extracting key points F1 from the bounding box data collected through the sensor module, and generating skeleton data of the object;
    perform a spatial feature extraction operation of calculating a respective length F2 and a respective angle F3 of a respective bone vector based on the key points F1 and the skeleton data, and extracting spatial features from a result of calculating, each spatial feature including the respective length F2 and the respective angle F3 of the respective bone vector;
    generate a new feature F4 by concatenating the input feature of the key points F1 and the spatial features each including the respective length F2 and the respective angle F3 of the respective bone vector; and
    recognize hand signals made by the object or a behavior of the object by inputting the new feature F4 to a neural network-based model.

8. The system of claim 7, wherein the calculating comprises, when the skeleton data is formed of 0 to 17 key points, setting a bone corresponding to a distance between key points to X0 to X17 in order to calculate the length of the bone vector, and normalizing respective bone vectors to X0 vector by applying Equation 1 presented below:

$$F_2 \rightarrow \left\{ \frac{\|X_i\|}{\|X_0\|} \right\}_{i \in \{0, \ldots, 17\}}. \qquad \text{Equation 1}$$

9. The system of claim 8, wherein the calculating comprises, when the skeleton data is formed of 0 to 17 key points, calculating an angle of a bone vector adjacent to each key point by applying Equation 2 presented below:

$$F_3 \rightarrow \left\{ \cos\left( \frac{\vec{x_i} \cdot \vec{x_j}}{\|x_i\| \|x_j\|} \right) \right\}_{i \in \{0, \ldots, N\}, j \in \{0, \ldots, M\} | i \neq j}. \qquad \text{Equation 2}$$

10. The system of claim 7, wherein the behavior recognition AI network system is configured to recognize the hand signals made by the object or a behavior of the object by applying the new feature F4 to an RT-GCN model corresponding to the neural network-based model.

11. The system of claim 10, wherein the RT-GCN model comprises: an RT-GCN block which comprises a robust GCN provided to ensure robustness by applying various types of fixed adjacency matrixes in case key points are misrecognized, and a TCN provided to consider time-series characteristics; and a pooling layer and a FCN provided to recognize hand signals made by an object or a behavior of the object.

12. The system of claim 11, wherein an input tensor of the RT-GCN block is expressed by C×T×V, where C is a number of channels of the new feature F4, T is a number of temporal frames, and V is a number of nodes of key points of a skeleton.

* * * * *